(12) United States Patent  (10) Patent No.: US 8,910,917 B1
Bees  (45) Date of Patent: Dec. 16, 2014

(54) MOVEABLE MOTOR SUPPORT

(75) Inventor: Edward John Bees, Waynesville, OH (US)

(73) Assignee: The Overly Hautz Motor Base Company, Lebanon, OH (US)

(*) Notice: Subject to any disclaimer, the term of this patent is extended or adjusted under 35 U.S.C. 154(b) by 176 days.

(21) Appl. No.: 12/814,064

(22) Filed: Jun. 11, 2010

Related U.S. Application Data

(60) Provisional application No. 61/186,248, filed on Jun. 11, 2009.

(51) Int. Cl.
*F16M 1/00* (2006.01)

(52) U.S. Cl.
USPC ............. 248/657; 248/676; 248/678; 384/13; 384/28; 474/26; 474/115

(58) Field of Classification Search
CPC ........ F16M 7/00; H02K 5/26; F16C 29/0609; F16C 33/6648; F01L 3/08
USPC ............ 248/298.1, 346.03, 346.06, 644, 656, 248/657, 672, 673, 676, 678; 384/13, 28; 474/26, 114, 115
See application file for complete search history.

(56) References Cited

U.S. PATENT DOCUMENTS

| | | | | |
|---|---|---|---|---|
| 2,833,597 A | * | 5/1958 | Sloyan | 384/38 |
| 2,934,384 A | * | 4/1960 | Sloyan | 384/42 |
| 3,586,273 A | * | 6/1971 | Sloyan | 248/657 |
| 3,893,646 A | * | 7/1975 | Sloyan | 248/657 |
| 3,908,941 A | * | 9/1975 | Bromley et al. | 248/657 |
| 4,120,210 A | * | 10/1978 | Sloyan | 474/26 |
| 4,133,508 A | * | 1/1979 | Sloyan et al. | 248/558 |
| 4,252,380 A | | 2/1981 | Sloyan et al. | |
| 4,507,937 A | | 4/1985 | Bretz | |
| 6,553,855 B2 | | 4/2003 | Takahashi et al. | |
| 6,981,685 B1 | | 1/2006 | McHugh et al. | |
| 7,077,375 B1 | | 7/2006 | McHugh et al. | |
| 7,338,400 B2 | | 3/2008 | Pierjok et al. | |

* cited by examiner

*Primary Examiner* — Gwendolyn W Baxter
(74) *Attorney, Agent, or Firm* — Wood, Herron & Evans, LLP

(57) ABSTRACT

A motor support has a slidable carriage that includes a pair of elongated tubes slidably encompassing parallel elongated fixed cylindrical rails on a stationary base bed with bearing sleeves press fitted in the end portions of the glider tubes. The bearing sleeves support the guide tubes on the rails and transfer the motor load on the glider tubes to the rails with a reservoir of a viscous lubricant within the center portions of the glider tubes. A spring commands the strength of the movement of the slidable carriage and is sealed in a spring housing using one or more gusset plates.

13 Claims, 2 Drawing Sheets

MOVEABLE MOTOR SUPPORT

CROSS-REFERENCE TO RELATED APPLICATION

The present application claims priority to U.S. Provisional Patent Application No. 61/186,248 as filed Jun. 11, 2009.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to supports for motors, and more particularly to an improved method of manufacturing and composition of movable supports required for motors.

2. Description of the Related Art

Motor supports of which the exemplary embodiments herein are of a general type are well known in the art and, having regard particularly to supports for motors or articles of machinery, prior art examples will be given in the following.

It is vital to understand that the present invention has particular significance and importance in the environment of supporting motors for driving machinery through belts and pulleys and for supporting the machinery that is driven through belts and pulleys by motors.

In an exemplary but not restrictive environment, a motor is equipped with a drive pulley of a fixed diameter and an adjoining powered piece of machinery is equipped with a driven pulley of a fixed diameter. Thus, an increase in the work load will result in a decrease in the speed of the driven pulley and increase the tension on the belt which transfers power from the motor to the driven equipment. To maintain tension equilibrium between the belt and the spring, the center distance between the motor and the driven equipment reduces. This reduction minimizes belt slippage and allows the driven equipment to efficiently receive power and accelerates returning to normal operating speed with the result of reduced wear on the pulleys, belts, and bearings while reducing energy consumption. As the driven belt returns to normal operating speed, the center distance between the motor and the driven equipment also returns to substantially normal spacing.

In order to effect such changes, a motor is mounted on a movable carriage supported on a fixed base which has two or more parallel and cylindrical solid rods that define parallel rails. The carriage is able to slide on the rails so that the carriage can move rapidly to achieve changes in speed. If the carriage is to be moved manually on the rails, as is usually the case, it can be appreciated that it is essential that such movement be accomplished with a minimum amount of physical exertion.

Various expedients have been employed in attempts to properly support the carriage so that the carriage and the motor load thereon are evenly transferred to the rails and yet to support the carriage in a way to reduce friction resistance to the sliding of the carriage on the rails.

In an early motor support, exemplified in U.S. Pat. No. 2,762,663 to Sloyan, a fixed portion of the motor support has parallel rails which are made fast to transverse end cleats and the motor carriage has channel-shaped gliders that encompass portions of the rails and provide a race between the corners thereof and the curved surfaces of the rail with a series of balls being disposed within such defined races. It has been found that the ball bearings, which establish line contacts, are not efficient for many reasons including the fact that grooves are developed in the rails which cause the sliding action to lose efficiency and which also cause the carriage to have a tendency to chatter.

In related U.S. Pat. No. 2,833,597 also to Sloyan, the gliders are composed of rectangular tubes which are square in cross section and have an inside dimension materially greater than the outside dimension of the cylindrical rails. C-shaped bearing assemblies are provided between the gliders and the rails. Such assembly consists of a metallic bushing which has a freely slidable, non-chattering fit on the rails, a C-shaped metallic member, equal in length to the bushing, the external circumference of which makes line contact with three adjacent internal surfaces of the square tube glider, a member of resilient material equal in length to and having a push fit over the bushing and having an external diameter slightly greater than the nominal internal diameter of the C-shaped member, so that as the assembly of bushing, resilient member and C-shaped member are forced into the glider, that portion of the resilient member not enveloped by the C-shaped member but which contacts the internal surface of the remaining wall of the glider becomes slightly distorted due to being somewhat compressed between the bushing and the glider. The result is that the bushing becomes slightly non-concentric with the glider. However, the advantage of the resiliency overshadows the lack of concentricity. The resiliency does much to reduce noise likely to develop between the two metallic parts, the bushing and the rail. A typical example is that any noise developed at the source of an air conditioning system is likely to be telegraphed to every room in a building.

U.S. Pat. No. 4,252,380 to Sloyan has been an industry standard for slidable motor supports since the early 1980s, and is a motor support having a carriage movably mounted by means of gliders, which are cross-sectionally square elongated tubes, that slidably encompass parallel elongated fixed rails on a stationary base bed with plastic or metal bearing sleeves press fitted in the end portions of the glider tubes to bearingly support them on the rails and transfer the motor load on the glider tubes to the rails in a friction free manner with a reservoir of a viscous lubricant within the center portions of the glider tubes. This motor support was a culmination of decades of work, and served the industry. However, such motor support may be difficult and time-consuming to manufacture. In an era of financial concerns, a more cost-effective and high quality motor support is needed Thus, what is needed is a slidable motor support that is highly effective, yet more easily manufactured and less expensive.

SUMMARY

The various exemplary embodiments of the present invention include a motor support comprised of two or more cylindrical rails, a first cleat and a second cleat, and a slidable carriage. The two or more cylindrical rails each have a substantially similar precise diameter and substantially smooth outer surfaces. Each of the two or more cylindrical rails is arranged in a longitudinal orientation and is substantially parallel to one another. The first cleat and the second cleat are positioned substantially perpendicular to the one or more cylindrical rails, wherein the first cleat is positioned at one end of the two or more cylindrical rails and the second cleat is position at the opposing end of the two or more cylindrical rails. The slidable carriage envelopes portions of the two or more cylindrical rails, and the slidable carriage is comprised of one or more motor support plates, two or more glider tubes, bearing sleeves, lubricant reservoirs, and a spring-loaded tension controlling means. The two or more glider tubes connect to a bottom side of the one or more motor support plates and have an external square cross-sectional shape and internal axial bores movably encompassing the two or more cylindrical rails. Each of the two or more glider tubes has open end portions and center portions. The bearing sleeves are tightly press fitted in the end portions of the two or more glider tubes, wherein the bearing sleeves have axially extending bores of round cross-section having an inner diameter and an outer diameter. The inner diameter is of a smooth surface and is of a predetermined size to substantially surround the substantially smooth outer surfaces of each of the two or more cylindrical rails such that the bearing sleeves may slide freely on the two or more cylindrical rails. The outer diameter is sized to substantially fit within the two or more glider tubes such that the end portions of the glider tubes and the bearing sleeves are substantially flush with one another. The lubricant reservoirs are located at a center portion of the two or more glider tubes, such that the lubricant reservoirs retain viscous lubricant to allow the two or more glider tubes to be self-lubricating as the bearing sleeves slide on the cylindrical rails. The spring-loaded tension controlling means is comprised of a tension adjusting screw connecting through each of the first cleat and second cleat, a spring housing, a spring, a tensioning nut, a tensioning follower nut, and at least one gusset plate. The spring housing substantially surrounds the tension adjusting screw and has a first end opening and a second end opening of a diameter slightly greater than a diameter of the tension adjusting screw. The spring is surrounded by the spring housing and surrounds the tension adjusting screw. The at least one gusset plate is substantially perpendicular to the one or more motor support plates and a second opening of the spring housing. The at least one gusset may further connect to the two or more glider tubes and substantially seal the spring within the spring housing.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

Figure 1:
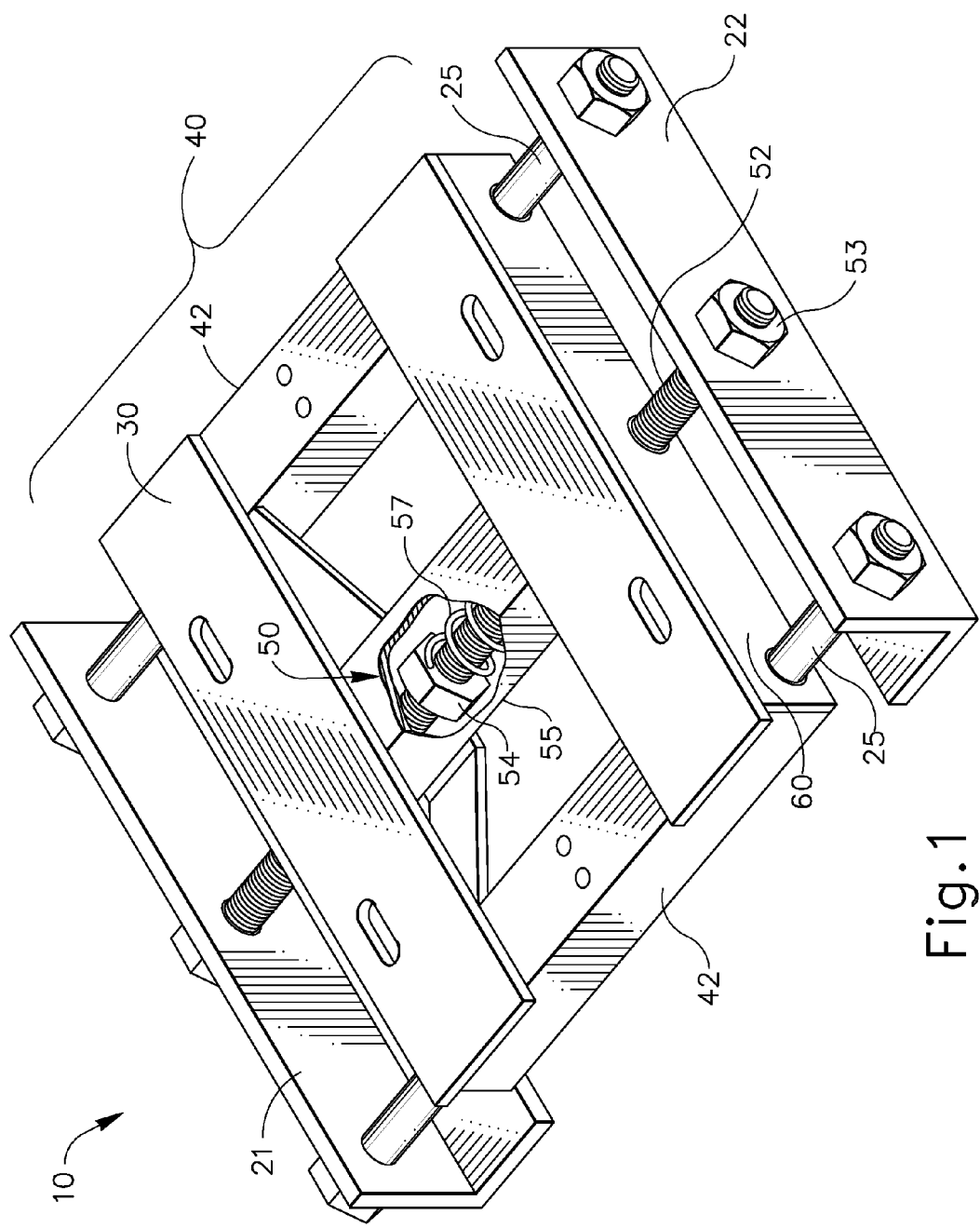
FIG. 1 is a perspective view of a moveable motor support according to exemplary embodiments of the present invention.
Figure 2:
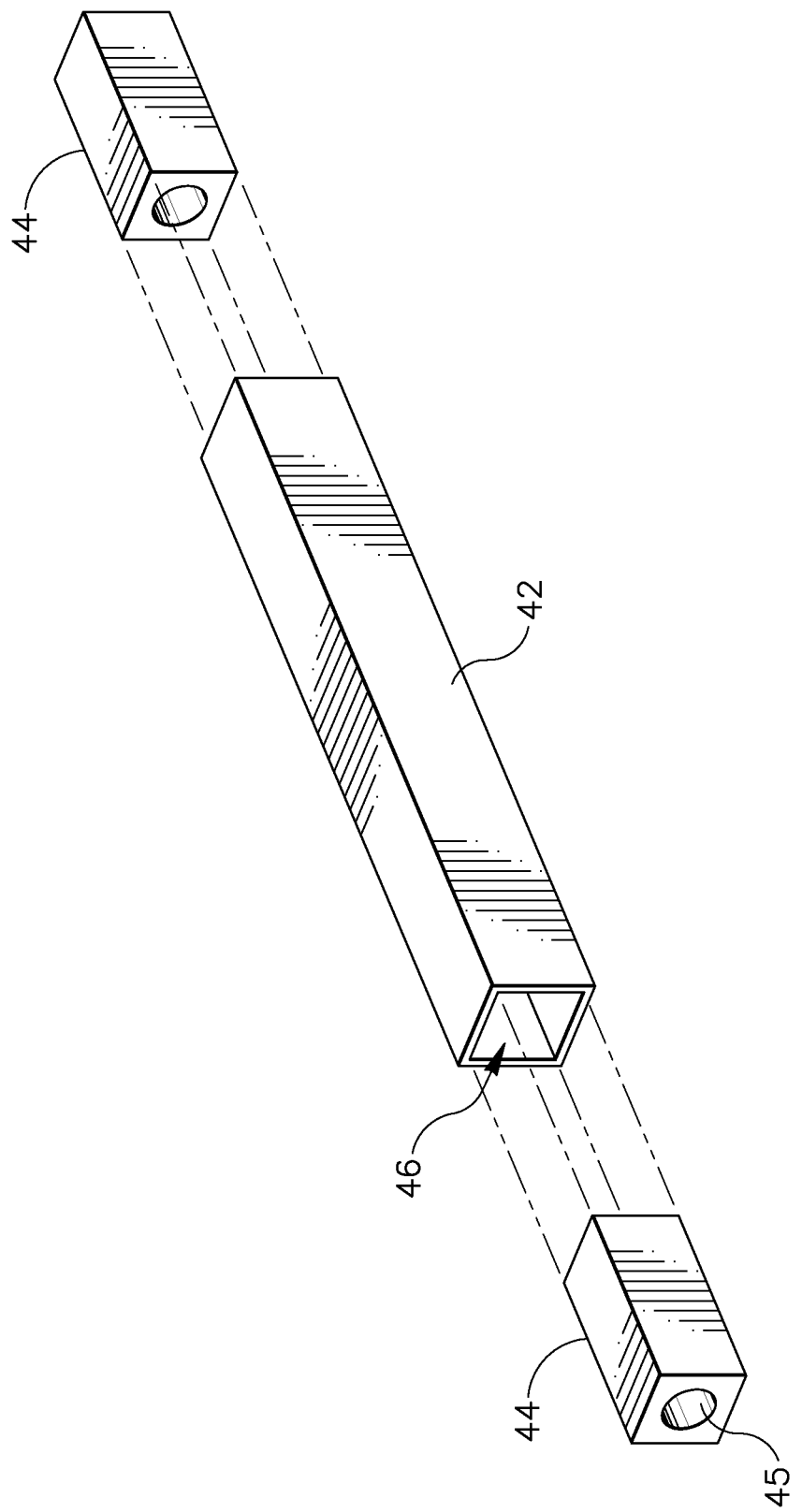
FIG. 2 is an illustration of a glider tube and bearing sleeve according to exemplary embodiments of the present invention.

In reference to the drawings, similar reference characters denote similar elements throughout all the drawings. The following is a list of the reference characters and associated element:

10 motor support
21 first cleat
22 second cleat
25 cylindrical rail
30 slidable carriage
40 motor support plate
42 glider tube
44 bearing sleeves
45 internal diameter
46 lubricant reservoirs
50 spring-loaded tension controlling means
52 tension adjusting screw
53 tensioning nut
54 tensioning follower nut
55 spring housing
57 spring
60 gusset plate

DETAILED DESCRIPTION

FIG. 1 is a perspective view illustration of a motor support 10 according to exemplary embodiments of the present invention. The motor support is meant for maintaining a machine driven by a belt drive or motor, or for which can be used in any other machinery supporting environment. Examples include fan, conveyors, mixers, compressors, rock crushers, and the like.

The motor support is comprised of two or more cylindrical rails 25, a first cleat 21, a second cleat 22, and a slidable carriage 30.

The motor support 10 is typically rectangular or square in shape, having a substantially planar bottom side and substantially planar top side. The bottom side of the motor support may be mounted to a floor, a work space, to another base, and the like. A machine or motor may then be positioned on the top side of the motor support on the slidable carriage 30.

The two or more cylindrical rails 25 possess a substantially similar diameter and length. An outer surface of each of the two or more cylindrical rails is substantially smooth, and the two or more cylindrical rails are arranged in a longitudinal orientation to be substantially parallel respective to each other.

The two or more cylindrical rails are typically comprised of steel, but may be composed of any strong and resilient metal, alloy, ceramic, or the like.

The first cleat 21 and second cleat 22 are positioned substantially parallel respective to each other, and substantially perpendicular to each of the two more cylindrical rails. Thus, the first cleat is positioned at one end of the two or more cylindrical rails and the second cleat is positioned at the opposing end of the two or more cylindrical rails. The two or more cylindrical rails are fastened to the first cleat and the second cleat by nuts, bolts, or other similar fastening means.

The slidable carriage 30 envelopes portions of the two or more cylindrical rails such that the slidable carriage may move between the first cleat and the second cleat.

The slidable carriage 30 is comprised of one or more motor support plates 40, two or more glider tubes 42, bearing sleeves 44, lubricant reservoirs 46, and a spring-loaded tension controlling means 50.

The one or more motor support plates 40 are on the top side of the slidable carriage and as noted above is typically where the motor or machinery is positioned.

The two or more glider tubes 42 are attached to a bottom of the one or more motor support plates. Typically, the two or more glider tubes have an external square-shaped cross section. However, the external cross section may be of any desired shape as needed. The two or more gliders also have bearing sleeves 44 that moveably encompass the two or more cylindrical rails 25, such that each of the two or more glider tubes have open end positions and center positions.

The bearing sleeves 44 are tightly press-fitted in the end portions of the two or more glider tubes. Each bearing sleeve has axially extending bores of substantially circular cross-section, having an inner diameter and a substantially square outer shape. The inner diameter 45 is a substantially, and preferably exceptionally, smooth surface of a predetermined size to substantially surround the substantially smooth outer surface of each of the two or more cylindrical rails such that the bearing sleeves may free slide on the two or more cylindrical rails. The substantially square outer shape is of a predetermined size to substantially fit within a glider tube such that the end portion of each of the glider tube and the associated bearing sleeve are substantially flush with one another.

The actual size, be it diameter, length, or both, and the number of cylindrical tubes and associated glider tubes is dependent upon the associated motor, work being performed by the associated driven unit, and pulley diameter.

The center portion of each of the two or more gliders is where the lubricant reservoirs 46 are located. The lubricant reservoirs substantially retain viscous lubricant that allows the two or more glider tubes to be substantially self-lubricating as the bearing sleeves slide on the two or more cylindrical rails. The actual lubricant varies dependent upon, for example, environment, temperature, situation, chemical interactions, and desired life of the motor support. The lubricant may be natural or synthetic.

The spring-loaded tension controlling means 50 is comprised of a tension adjusting screw 52, a tensioning nut 53, a tensioning follower nut 54, a spring housing 55, a spring 57, and at least one gusset plate 60.

The spring-loaded tension controlling means is positioned between each of the first cleat and the second cleat. The spring loaded-tension controlling means is substantially parallel to each of the two or more cylindrical rails. As illustrated in FIG. 1, the spring loaded tension controlling means is positioned substantially equidistant from each of the two or more cylindrical rails.

The tension adjusting screw 52 connects through and is connected to each of the first cleat and second cleat, as well as to the tensioning nut 53 and the tensioning follower nut 54.

The spring housing substantially surrounds the tension adjusting screw and has a first end opening and a second end opening. Each opening possesses a diameter at least slightly greater than a diameter of the spring. The tension of the spring is adjusted with the tensioning follower nut, tensioning nut, or both, in association with the tension adjusting screw.

The spring is surrounded by the spring housing. The spring surrounds a portion of the tension adjusting screw.

The at least one gusset plate is positioned to be substantially perpendicular to the one more motor support plates. The at least one gusset plate possess at least one opening located to allow substantially unobstructed movement of the tension adjusting screw. Thus, the opening in the gusset plate preferably circular and of a diameter greater than the diameter of the tension adjusting screw, but smaller than the diameter of the spring, thereby substantially sealing the spring within the spring housing.

The at least one gusset plate substantially increases efficiency and decreases costs of manufacturing as it requires fewer parts to be positioned to properly and adequately seal the spring within the spring housing.

The at least one gusset plate may further connect to the two or more glider tubes, and as illustrated in the example of FIG. 1, may also enclose the two or more cylindrical rails. However, in other embodiments, the one or more gusset plates do not surround the two or more cylindrical rails.

For simplification of disclosure, only two cylindrical rails and associated gliders have been shown and described but it can be understood that depending upon the nature and size of the support 10 a larger number of cylindrical rails and gliders will be used. Thus, while the best known form of the invention has been described in the foregoing and illustrated in the accompanying drawing, such is merely exemplary.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A motor support comprised of:

two or more cylindrical rails each having a substantially similar precise diameter and substantially smooth outer surfaces, such that the two or more cylindrical rails are arranged in a longitudinal orientation and substantially parallel to one another;

a first cleat and a second cleat positioned substantially perpendicular to the one or more cylindrical rails, wherein the first cleat is positioned at one end of the two or more cylindrical rails and the second cleat is position at the opposing end of the two or more cylindrical rails; and a slidable carriage enveloping portions of the two or more cylindrical rails, wherein the slidable carriage is comprised of:

one or more motor support plates;

two or more glider tubes connected to a bottom side of the one or more motor support plates and having an external square cross-sectional shape and internal axial bores movably encompassing the two or more cylindrical rails, such that each of the two or more glider tubes have open end portions and center portions;

bearing sleeves tightly press fitted in the end portions of the two or more glider tubes, wherein the bearing sleeves have axially extending bores of round cross-section having an inner diameter and a substantially square outer shape, the inner diameter being of a smooth surface and being of a predetermined size to substantially surround the substantially smooth outer surfaces of each of the two or more cylindrical rails such that the bearing sleeves may slide freely on the two or more cylindrical rails, and the substantially square outer shape being sized to substantially fit within the two or more glider tubes such that the end portions of the glider tubes and the bearing sleeves are substantially flush with one another;

lubricant reservoirs located at a center portion of the two or more glider tubes, such that the lubricant reservoirs retain viscous lubricant to allow the two or more glider tubes to be self-lubricating as the bearing sleeves slide on the cylindrical rails; and a spring-loaded tension controlling means comprised of:

a tension adjusting screw connecting through each of the first cleat and second cleat;

a spring housing substantially surrounding the tension adjusting screw and having a first end opening and a second end opening of a diameter slightly greater than a diameter of a spring;

a tensioning nut connected to the tension adjusting screw;

a tensioning follower nut connected to the tension adjusting screw;

the spring surrounded by the spring housing and surrounding the tension adjusting screw; and at least one gusset plate being substantially perpendicular to the one or more motor support plates and a second opening of the spring housing, wherein the at least one gusset further connects to the two or more glider tubes and substantially seals the spring within the spring housing.

2. A motor support for a motor, comprising;

a first elongate rail and a second elongate rail arranged substantially parallel to one another;

a first cleat and a second cleat respectively positioned at opposite end portions of the first and second rails; and a carriage movably coupled with the first and second rails for supporting the motor, the carriage including:
- a motor support member configured to removably mount the motor thereon;
- a first glider tube and a second glider tube connected to the motor support member and arranged to receive the first and second elongate rails, respectively, such that the motor support member is configured to selectively slide along the first and second elongate rails;
- a tension adjusting member coupled with at least one of the first and second cleats;
- a biasing member operatively coupled to the tension adjusting member and the carriage to bias the carriage toward one of the first and second cleats;
- a housing defining an opening that receives the tension adjusting member and the biasing member such that the housing surrounds at least a portion of the tension adjusting member and the biasing member; and a gusset plate connected to and extending between both the first and second glider tubes, wherein the gusset plate covers the opening to retain the biasing member within the housing.

3. The motor support of claim 2, wherein the motor support member is a motor support plate.

4. The motor support of claim 3, wherein the gusset plate is positioned substantially perpendicular to the motor support plate and the opening.

5. The motor support of claim 2, wherein the first and second cleats are positioned substantially perpendicular to the first and second elongate rails.

6. The motor support of claim 2, wherein the first glider tube has a first axial bore, the second glider tube has a second axial bore, and the first and second axial bores receive the first and second elongate rails therein, respectively.

7. The motor support of claim 2, wherein the biasing member is a spring.

8. The motor support of claim 7, wherein the housing surrounds the spring and the spring surrounds the tension adjusting member.

9. The motor support of claim 2, wherein the tension adjusting member is a tension adjusting screw.

10. The motor support of claim 9 further comprising:
a tensioning nut coupled with the tension adjusting screw; and
a tensioning follower nut coupled with the tension adjusting screw.

11. The motor support of claim 2, wherein the first and second glider tubes each have open end portions and the first and second rails each have an outer surface, and the motor support further comprises:
bearing sleeves tightly press fitted in the open end portions of the first and second glider tubes, the bearing sleeves having axially extending bores that receive the outer surfaces of the first and second rails thereagainst such that the bearing sleeves slide on the first and second rails.

12. The motor support of claim 2, wherein the first and second glider tubes each have a center portion, and the motor support further comprises:
a lubricant reservoir positioned within the center portion of each of the first and second glider tubes and configured to retain viscous lubricant and provide viscous lubricant to each of the first and second glider tubes.

13. The motor support of claim 2, wherein the first and second elongate rails are generally cylindrical with substantially similar diameters and substantially smooth outer surfaces.

* * * * *

UNITED STATES PATENT AND TRADEMARK OFFICE
CERTIFICATE OF CORRECTION

| | | |
|---|---|---|
| PATENT NO. | : 8,910,917 B1 | |
| APPLICATION NO. | : 12/814064 | |
| DATED | : December 16, 2014 | |
| INVENTOR(S) | : Edward J. Bees | |

It is certified that error appears in the above-identified patent and that said Letters Patent is hereby corrected as shown below:

In the Specification:

Column 3,
Lines 8-9 read "second cleat is position at the" and should read -- second cleat is positioned at the --.

Column 4,
Lines 23-24 read "support is meant for maintaining a machine driven by a belt drive or motor, or for which can be usd in any" and should read -- support is meant for maintaining a machine driven by a belt drive or motor, or which can be used in any --.

Column 4,
Lines 25-26 read "Examples include fan, conveyors, mixers" and should read -- Examples include fans, conveyors, mixers --.

Column 5,
Line 54 reads "perpendicular to the one more motor support plates" and should read -- perpendicular to the one or more motor support plates --.

Column 5,
Lines 57-58 read "the opening in the gusset plate preferably circular and of a diameter" and should read -- the opening in the gusset plate is preferably circular and of a diameter --.

Column 6,
Line 10 reads "accompanying drawing, such is" and should read -- accompanying drawings, such is --.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,910,917 B1

In the Claims:

Claim 1, Column 6,
Line 28 reads "or more cylindrical rails and the second cleat is position" and should read -- or more cylindrical rails and the second cleat is positioned --.

Claim 2, Column 7,
Line 13 reads "A motor support for a motor, comprising;" and should read -- A motor support for a motor, comprising: --.